United States Patent Office 3,330,364
Patented July 11, 1967

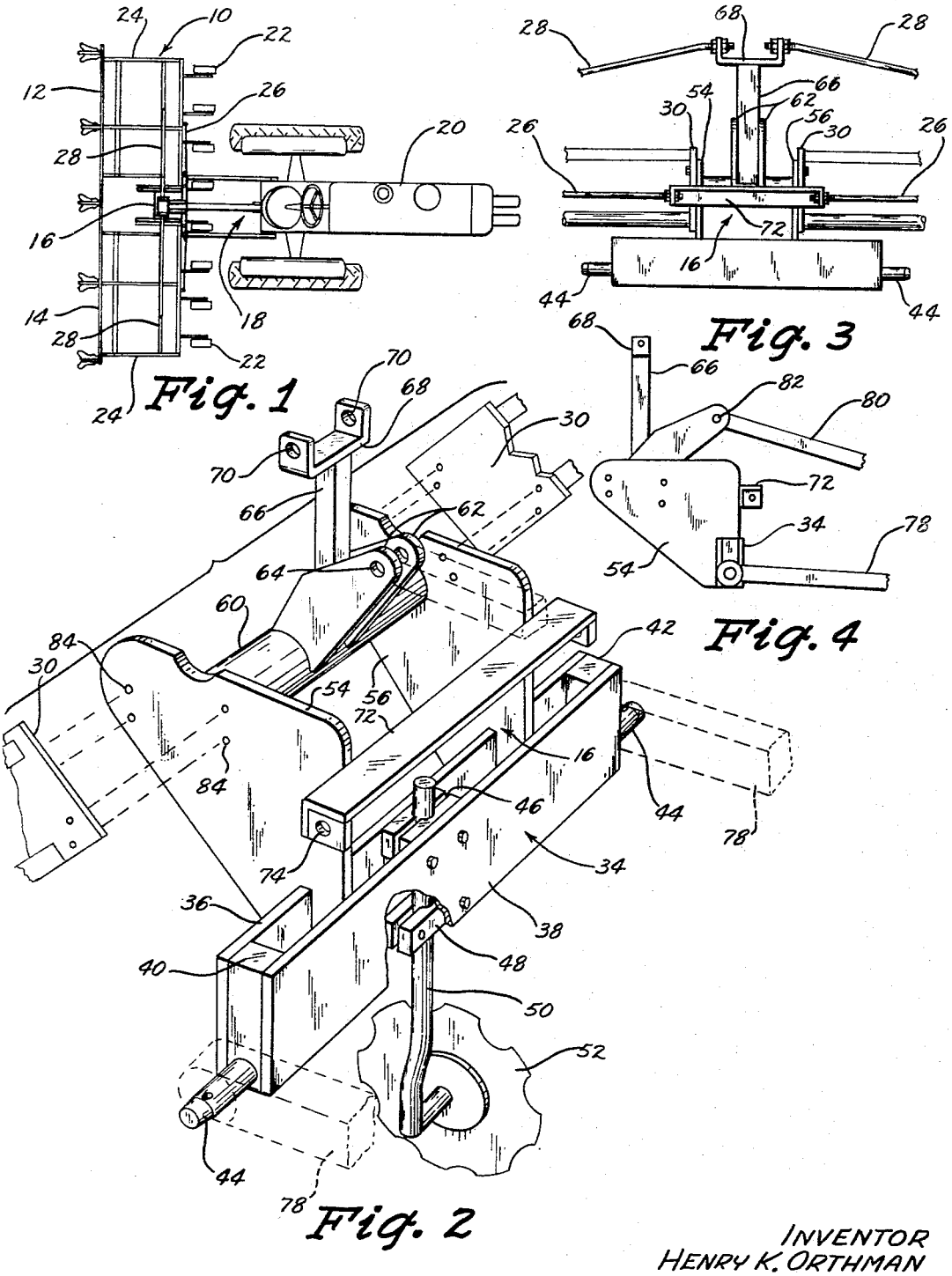

3,330,364
ASSEMBLY FOR MOUNTING MULTIPLE UNITS OF AN IMPLEMENT ON THE REAR END OF A TRACTOR
Henry K. Orthman, Rte. 2, Lexington, Nebr. 48850
Filed July 17, 1964, Ser. No. 383,275
9 Claims. (Cl. 172—451)

This invention relates to an assembly for mounting multiple units of an implement on the rear end of a tractor and in particular to a mounting assembly for multiple units of a cultivator.

Multiple unit cultivators are ordinarily mounted on either side of the front end of a tractor. However, the modern tractor hitches and lifts at the rear end of tractors makes it desirable to convert the front-mount cultivators to rear-mount cultivators. Accordingly, with the conversion unit of this invention, it is possible to easily couple together multiple cultivator units for securing to the hitch and lift apparatus on the rear end of a tractor.

It is thus one of the objects of this invention to provide a conversion unit for mounting conventional front-mount cultivator units to the rear hitch and lift assembly on a tractor.

It is still a further object of this invention to provide a rear-mount implement which may be quickly assembled and disassembled and when assembled quickly mounted on and removed from a tractor.

A further object of this invention is to provide a rear-mount implement having a plurality of units interconnected by a coupling unit employing stabilizer members for maintaining the implement units in positive alignment with each other.

It is a still further object of this invention to provide a rear-mount cultivator implement having a coulter wheel for guiding and stabilizing the unit during its operation.

A further object of this invention is to provide an assembly for mounting multiple units of an implement on the rear end of a tractor which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top plan view of a tractor detachably connected to a conversion unit having cultivator units on either side;

FIG. 2 is a perspective view of the conversion unit only;

FIG. 3 is a fragmentary elevation view of the conversion unit of FIG. 2 secured to the frame structure of cultivator units on either side and also illustrating the conversion unit means for mounting on the tractor hitch assembly; and FIG. 4 is a side elevation view of the conversion unit illustrated in FIG. 2 as viewed from a left side showing in particular its connecting means extending to the hitch assembly of a tractor (not illustrated).

In FIG. 1 of the drawings of a cultivator 10 having a pair of sections 12 and 14 are coupled together by a conversion unit 16 and mounted on the hitch assembly 18 of a tractor 20.

Each of the cultivator units 12 and 14 include support wheels 22 secured to frame assemblies 24. A forward stabilizer rod 26 is secured at one end to the frame 24 intermediate its length and the free end of the member 26 terminates at the inner end of the cultivator unit. Also a rear stabilizer rod member 28 is secured to the frame 24 at one end outwardly from the stabilizer rod 26 and also has its free end terminating at the inner end of the cultivator unit. As best illustrated in FIGS. 2 and 3 each of the cultivator units 12 and 14 are provided with mounting face plates or pads 30 on their inner ends.

Referring now to FIG. 2, the conversion coupling unit 16 is shown to include a forward transverse member 34 formed from a pair of parallel plates 36 and 38 secured at their ends by posts 40 and 42. At the lower end of the posts 40 and 42 pins 44 are provided extending transversely outwardly of the ends of the member 34. Between the plates 36 and 38 are two pairs of clamp jaw members 46 and 48 for adjustably receiving a shaft 50 which extends downwardly of the transverse member 34. A notched coulter wheel 52 is rotatably mounted on the free end of the shaft 50 and serves as a guide and stabilizer means for the conversion unit 16 and consequently the implement 10 secured thereto.

A pair of triangular shaped face plates 54 and 56 are secured to the plate 36 of the transverse member 34 and extend upwardly and rearwardly thereof. A cylindrical shaft or rod 60 extends between the outer ends of the plates 54 and 56 in parallel relationship to the transverse member 34. A pair of upstanding elements 62 are secured to the member 60. The upper free ends of the elements 62 have aligned openings 64 formed therein. A second upstanding member 66 in the form of a square in cross-section bar is secured to the member 60 between the plate 62 and terminates at its upper free end in a U-shaped bracket 68 having aligned openings 70 extending through each of its legs.

Above the transverse member 34, a second transverse member 72 is fixedly secured to the forward vertical edges of the face plates 54 and 56. An aperture 74 is formed in each end of the member 72.

As illustrated in the drawings, the hitch 18 is of the three-point type including a pair of rearwardly extending lift arms 78 which are in engagement with the pins 44 on opposite ends of the transverse member 34. A third hitch member 80 is connected by a pin 82 to the upper free ends of the upstanding plates 62. The pin 82 extends through the aligned openings 64 in the plates 62.

The cultivator sections 12 and 14 are secured to the conversion coupling unit 16 by bolting the inner plates 30 to the face plates 54 and 56 by use of the apertures 84 as illustrated in FIG. 2. Additionally, the rear stabilizer rods 28 have their free ends extending into the hole 70 in the U-shaped bracket 68 on the uupper free end of the upstanding elements 66. Suitable nut means are secured to the inner ends of the rods 28 to rigidly maintain the cultivator units 12 and 14 in their transverse aligned positions. To assist in maintaining the rigid construction of the cultivator 10, the forward stabilizer rods 26 are secured by suitable nut means to the apertured ends of the transverse member 72 in the conversion connecting unit 16 as best shown in FIG. 3.

Thus it is seen that the cultivator units 12 and 14 may previously have been secured to the front end of the tractor 20 and may be readily mounted on the rear end of the tractor by merely connecting the plates 30 to the adjacent plates 54 and 56 and additionally interconnecting the rods 28 to the upstanding posts 66 as well as connecting the rods 26 to the transverse member 72. Also the entire cultivator unit 10 may be easily mounted on and removed from the tractor hitch 18 by simply interconnecting the lift bars 78 to the pins 44 and inserting a bolt through the rearward end of the upper hitch member 80 and the aligned openings 64 in the upstanding plates 62. The conventional hydraulic lift assembly on the tractor is then used to lower and raise the cultivator 10. The coulter wheel 52 is vertically adjustable in the clamps 46 and 48 and will serve to guide the cultivator 10 along a straight line parallel to the line of travel of the tractor 20.

Some changes may be made in the construction and arrangement of my assembly for mounting multiple units of an implement on the rear end of a tractor without departing from the real spirit and purpose of my invention, and it is my intention to cover by my claims, any modified forms of structure or use of mechanical equivalents which may be reasonably included within their scope.

I claim:

1. In an implement for mounting on the rear end of a tractor wherein said tractor has a power lift, comprising,
    a pair of elongated implement units, each unit having a mounting means on one end, and lower and upper stabilizer members secured to said unit outwardly of said mounting means and having their free ends terminating adjacent said mounting means, the ends of said lower and upper stabilizer members and said mounting means on one of said units facing in the opposite direction of the corresponding members on the other unit,
    a conversion unit for detachably connecting together said implement units and adapted for detachably connecting said implement to said tractor, said conversion unit having a connecting means having connecting elements at opposite ends adapted to be connected to a tractor power lift,
    a pair of spaced apart face members extending rearwardly of said connecting means, each of said face members detachably connected to the adjacent mounting means of said implement units,
    a connecting member extending between said face members and disposed in parallel relationship to said connecting means and rearwardly thereof,
    means on each side of said conversion unit detachably connected to the lower stabilizer members on said implement units, and
    and upstanding arm secured to said conversion unit, said arm detachably coupled to each of said upper stabilizer members carried on said implement units.

2. The structure of claim 1 wherein said upper and lower stabilizer members are horizontally spaced apart.

3. The structure of claim 1 wherein an upstanding arm means is on said conversion unit and is adapted to be pivotally connected to the tractor power lift, said upstanding arm means and said first mentioned arm extending at an angle to each other.

4. The conversion unit of claim 1 and a coulter wheel is provided for engagement in the ground, said wheel being disposed vertically on the longitudinal center axis of the line of travel of said conversion unit, said coulter wheel serving to stabilize and guide said conversion unit during operation.

5. The conversion unit of claim 1 and a clamp means is provided on said connecting means, a vertically downwardly extending shaft is adjustably held by said clamp, a coulter wheel is rotatably mounted on the lower free end of said shaft for engagement with the ground, and said wheel is positioned along the longitudinal center axis of the line of travel of said conversion unit with said coulter wheel serving to stabilize and guide said conversion unit during operation.

6. The conversion unit of claim 1 wherein said connecting elements on said connecting means are in the form of outwardly extending pin elements adapted for detachably connecting a pair of rearwardly extending lift arms on a tractor to said conversion unit.

7. In a cultivator implement for mounting on the rear end of a tractor wherein said tractor has a power lift, comprising,
    a pair of elongated cultivator units, each unit having a mounting plate on one end, and forward and rearward stabilizer members secured to said unit outwardly of said mounting plate and having their free ends terminating adjacent said mounting plate, the ends of said forward and rearward stabilizer members and said mounting plate on one of said units being positioned in alignment and facing in the opposite direction of the corresponding members on the other unit,
    a conversion unit for detachably connecting together said cultivator units and adapted for detachably connecting said cultivator to said tractor, said conversion unit having a first member extending transversely of the line of travel of said implement, means at either end of said first member for detachable connection to a tractor power lift,
    a pair of spaced apart face members extending rearwardly of said first member, each of said face members detachably connected to the adjacent mounting plate of said cultivator units,
    a connecting member extending between said face members and disposed in parallel relationship to said first member and rearwardly thereof,
    means on each side of said conversion unit detachably connected to the forward stabilizer members on said cultivator units, and
    an upstanding arm secured to said connecting member, said arm detachably coupled to each of said rearward stabilizer members carried on said cultivator units.

8. The cultivator implement of claim 7 and a clamp means is provided on said first member, a vertically downwardly extending shaft is adjustably held by said clamp, a coulter wheel is rotatably mounted on the lower free end of said shaft for engagement with the ground, and said wheel is positioned along the longitudinal center axis of the line of travel of said conversion unit with said coulter wheel serving to stabilize and gude said conversion unit during operation.

9. In a cultivator implement for mounting on the rear end of a tractor wherein said tractor has a power lift, comprising,
    a pair of elongated cultivator units, each unit having a mounting plate on one end, and forward and rearward stabilizer members secured to said unit outwardly of said mounting plate and having their free ends terminating adjacent said mounting plate, the ends of said forward and rearward stabilizer members and said mounting plate on one of said units being positioned in alignment and facing in the opposite direction of the corresponding members on the other unit,
    a conversion unit for detachably connecting together said cultivator units and adapted for detachably connecting said cultivator to said tractor, said conversion unit having a first member extending transversely of the line of travel of said implement, pin means at either end of said first member for detachable connection to a tractor power lift,
    a pair of spaced apart face members extending rearwardly of said first member, each of said face members detachably connected to the adjacent mounting plate of said cultivator units, a connecting member extending between said face members and disposed in parallel relationship to said first member and rearwardly thereof, an upstanding arm secured to said connecting member and adapted to be pivotally connected to the tractor power lift, means on each side of said conversion unit detachably connected to the forward stabilizer members on said cultivator units, and a second upstanding arm secured to said connecting member and extending at an angle to said first mentioned upstanding arm, said second arm detachably coupled to each of said rearward stabilizer members carried on said cultivator units.

References Cited

UNITED STATES PATENTS

| | | | |
|---|---|---|---|
| 2,335,175 | 11/1943 | Davenport | 172—254 |
| 2,575,801 | 11/1951 | Evans | 172—254 X |
| 2,662,783 | 12/1953 | Sawyer | 280—461 |
| 2,727,448 | 12/1955 | Taylor | 172—439 X |
| 2,755,722 | 7/1956 | Fragg | 172—451 X |
| 2,772,617 | 12/1956 | Tangeman | 172—109 X |

ABRAHAM G. STONE, *Primary Examiner.*

WILLIAM A. SMITH III, *Examiner.*

A. E. KOPECKI, *Assistant Examiner.*